(12) United States Patent
McCoy

(10) Patent No.: US 11,803,888 B2
(45) Date of Patent: *Oct. 31, 2023

(54) SYSTEM AND METHOD TO PROCESS MEAT

(71) Applicant: Field To Freezer, LLC, Brookfield, WI (US)

(72) Inventor: Matthew McCoy, Brookfield, WI (US)

(73) Assignee: Field To Freezer, LLC, Brookfield, IL (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/454,422

(22) Filed: Nov. 10, 2021

(65) Prior Publication Data

US 2022/0067809 A1     Mar. 3, 2022

Related U.S. Application Data

(63) Continuation of application No. 16/568,032, filed on Sep. 11, 2019, now Pat. No. 11,195,218.

(51) Int. Cl.
| | |
|---|---|
| *G06Q 30/0601* | (2023.01) |
| *G06Q 50/04* | (2012.01) |
| *G06K 7/14* | (2006.01) |

(52) U.S. Cl.
CPC ..... *G06Q 30/0621* (2013.01); *G06Q 30/0633* (2013.01); *G06Q 30/0641* (2013.01); *G06Q 50/04* (2013.01); *G06K 7/1417* (2013.01)

(58) Field of Classification Search
CPC ..... G06Q 30/0601–0643; G06Q 50/04; G06Q 50/10; G06Q 50/12; A23J 1/00;

(Continued)

(56) References Cited

U.S. PATENT DOCUMENTS

| | | |
|---|---|---|
| 7,584,136 B2 | 9/2009 | Shuler et al. |
| 2003/0170357 A1 | 9/2003 | Garwood |

(Continued)

FOREIGN PATENT DOCUMENTS

KR     1020150073275 A     12/2016

OTHER PUBLICATIONS

Brownsvalleymeat, , "Custom Meat Processing", www.brownsvalleymeat.com. Dated from Mar. 17, 2018 to Apr. 9, 2018. Recovered via www.Archive.org.

*Primary Examiner* — William J Allen
(74) *Attorney, Agent, or Firm* — Michael G. Kelber; Neal, Gerber & Eisenberg LLP

(57) ABSTRACT

Method and apparatus are disclosed for processing meat. An example system comprises a database that includes estimates of meat weight associated with characteristics of an animal. The system also includes a server that, after receiving first characteristics of a first animal, generates a first meat weight of the first animal using the estimates in the database. Additionally, in some examples, the system includes an application that is downloadable onto a mobile device. The application (i) receives, via a first presented interface, a selection of the first animal, (ii) receives, via a series of second presented interfaces, the first characteristics of the first animal, (iii) sends the first characteristics to the server and receives the first meat weight, (iv) receives, via a series of third presented interfaces, an allocation of the first meat weight to goods offered by a processor, and (v) composes an order based on the allocation.

20 Claims, 17 Drawing Sheets

(58) Field of Classification Search
CPC ........ A23J 1/02; A23J 3/00; A23J 3/04; A23L 5/00; A23L 5/20; A23L 13/00; A23L 13/10

See application file for complete search history.

(56) References Cited

U.S. PATENT DOCUMENTS

| | | |
|---|---|---|
| 2004/0078390 A1 | 4/2004 | Saunders |
| 2020/0160425 A1 | 5/2020 | Maiocco et al. |
| 2020/0184486 A1 | 6/2020 | Spoor |

← Main Menu    Field to Freezer Express Line    ⓐ Welcome, Matt ≡

Change | Deer Processing Co. | Open 6:00 AM - 6:00 PM
       | 123 Venison Road, Slinger, WI 12345 | (262) 555-0000

Meat Utilization
100% Selected for Processing

GROUND OPTIONS

Your selected processor offers a variety of options for ground meat. Please select how you would like your remaining 14% (16 lbs.) of venison processed.

⊖ Ground Venison ⊕
   0% Selected

⊖ Ground Venison + Pork Filler ⊕
   14% Selected - Est. 16 lbs.

⊖ Ground Venison + Beef Filler ⊕
   0% Selected

Order Estimate

| Hide and Antler Selection | Change |
|---|---|
| Antlers | $8.67 |
| Head | $8.67 |

| Packaged Cuts | Change |
|---|---|
| Tenderloin | $8.67 |
| Roast | $8.67 |
| Ribs | $8.67 |

| Processed Meat | Change |
|---|---|
| Smoked Honey Jerky | $102.06 |
| 54 lbs. @ $1.89/lb. | |
| 1 lb. packs | |
| Breakfast Sausage | $67.50 |
| 30 lbs. @ $2.25/lb. | |
| Summer Sausage | $24.43 |
| 7 lbs. @ $3.49/lb. | |
| Pepper Jack Sticks | $19.37 |
| 13 lbs. @ $1.49/lb. | |

| Ground Meat | |
|---|---|
| Ground Venison + Pork Filler | $62.24 |
| 16 lbs. @ $3.89/lb. (3 lb. packages) | |

| Total Processor Estimate | $318.95 |

ⓘ Processor requires $100.00 down-payment at drop-off to start your order. Any applicable state sales tax will be added to the balance of your order.

← Adjust Selected Items        Confirm Order

FIG. 3I

SYSTEM AND METHOD TO PROCESS MEAT

CROSS-REFERENCE TO RELATED APPLICATION

This application is a continuation of U.S. Non-Provisional patent application Ser. No. 16/568,032, filed Sep. 11, 2019 and entitled "System and Method to Process Meat," the entire contents of the application being incorporated by reference herein.

TECHNICAL FIELD

The present disclosure generally relates to facilitating efficient food processing and, more specifically, a system and method to process meat.

BACKGROUND

After successfully hunting, hunters field dress the animal. The animal then needs to be butchered. Hunters with the appropriate knowledge can butcher the animal to process an animal into, for example, cuts of meat, sausages, and/or ground meat, etc. Sometimes, a hunter will opt for taking the animal to a processor instead. For example, the hunter may be on a trip in another state or may not have the time or skill to butcher the animal. However, finding a quality processor that can process the animal according to the hunter's preferences can be difficult and time consuming. Additionally, the hunter does not always have up-to-date information about goods and services offered by any one processor. After selecting a processor, the hunter must deliver the animal and tell the processor what cuts of meat they want without knowing how much they can order or how much the butchering process will cost.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for processing meat. An example system comprises a database that includes estimates of meat weight associated with characteristics of an animal. The system also includes a server that, after receiving first characteristics of a first animal, generates a first meat weight of the first animal using the estimates in the database. Additionally, the system includes an application that is downloadable onto a mobile device. The application (i) receives, via a first presented interface, a selection of the first animal, (ii) receives, via a series of second presented interfaces, the first characteristics of the first animal, (iii) sends the first characteristics to the server and receives the first meat weight, (iv) receives, via a series of third presented interfaces, an allocation of the first meat weight to goods offered by a processor, and (v) composes an order based on the allocation. The server generates an indicia to provide to the application and processor to associate the first animal with the order when the first animal is delivered to the processor, and sends the order to the processor.

An example system includes a first database that includes estimates of meat weight associated with characteristics of an animal and a second database that includes processors with associated lists of goods and services offered by the processors. The system also includes a server that, after receiving first characteristics of a first animal, generates a first meat weight of the first animal using the estimates in the database. Additionally, the system includes an application executing on a mobile device. The application (i) receives, via a first presented interface, a selection of the first animal, (ii) receives, via a series of second presented interfaces, the first characteristics of the first animal, (iii) sends the first characteristics to the server and receives the first meat weight, (iv) receives, via a series of third presented interfaces, an allocation of the first meat weight using the list of goods and services associated with a selected one of the processors, and (v) composes an order based on the allocation. The server generates an indicia to provide to the application and processor to associate the first animal with the order when the first animal is delivered to the processor, and sends the order to the processor.

An example method is executed on a processor of a mobile device and/or on a web server that is displayed on (e.g., via a web browser) and receives input from (e.g., via a touch screen) a mobile device. The example method includes receiving, via a first interface presented on a touchscreen on the mobile device, a selection of a processor, the selection being based on a current location of the mobile device. The example method also includes receiving, via a second interface, a selection of an animal. Additionally, the example method includes receiving, via a series of third interfaces, characteristics of the animal and sending the characteristics to a remote server. The example method includes receiving an estimate meat weight from the remote server, the estimated meat weight being calculate based on the characteristics. The example method also includes receiving, via a series of fourth interfaces, an allocation of the estimated meat weight using the list of goods and services associated with the selected processor and composing an order based on the allocation. The method includes, in response to sending the order to the remote server, receiving an indicia to associate the order with the animal and displaying the indicia on a fifth interface to provide into a scanner located at the selected processor.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 3A through 3J illustrate graphical user interfaces presented by the application of FIG. 2 to facilitate processing meat.

DETAILED DESCRIPTION OF EXAMPLE EMBODIMENTS

Figure 1:
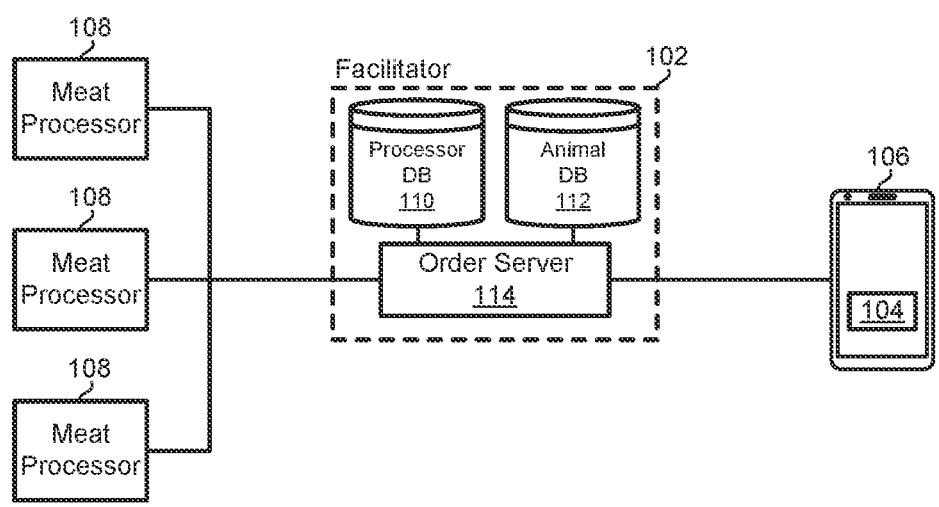
FIG. 1 illustrates a system to facilitate processing meat according to the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As described below, a system includes a server that communicates with mobile devices and meat processors (referred to as "processors" herein) to facilitate efficient processing of animals into cuts of meat and/or other animal parts. A processor is a company or person that receives an animal carcass and butchers it into, for example, various cuts of meat, sausages, and/or ground meat products. The processor may also preserve other parts of the animal, such as the hide, head, and/or antlers. The server includes a database of processors and menus (e.g., a list of services and/or capabilities offered by the processor). Using information input from an application executing on a mobile device, the server estimates an amount of meat weight (e.g., the weight of meat that is suitable for butchering) on the animal carcass. Using this information, the application presents the menu of the processor and receives entry of selections from a user. The application tracks the selections from the menu versus the estimated meat weight. In some examples, the application presents sliders to facilitate the user dynamically allocating the estimated meat weight (e.g., by percentage, by weight, etc.) to the goods and/or services selected on the menu. The estimate meat weight that is not used is converted into an order for ground meat. When the order is completed, the application transmits the order to the server. The order servers provides indicia (e.g., an order number, a bar codes, a QSR code, etc.) to the application that serves to identify the order. The server transmits the order to the selected processor along with the indicia. The user may then deliver the animal to the processor to be processed according to the order.

FIG. 1 illustrates a system 100 to facilitate processing meat according to the teachings of this disclosure. The system 100 provides an intuitive interface (as illustrated in FIGS. 3A-3J below) that facilitates the ordering of meat processing services when an amount of available meat is unknown and when efficient ordering is necessary when time is a factor (e.g., from when the animal is field dressed to when the animal is delivered to a processor). In the illustrated example, the system 100 includes a facilitator 102 and an application 104 executing on a mobile device 106 (e.g., a smartphone, a smartwatch, a tablet, etc.). Alternatively or additionally, in some examples, the system may include a web server that serves interfaces (as described below) to and receives input from a web browser executing on a computing device (e.g., a desktop computer, a laptop computer, a workstation, etc.) or a web browser executing on the mobile device 102.

The facilitator 102 is in communication with the application 104 and a plurality of processors 108. The facilitator 102 provides information about the processors 108 (e.g., location, menu, etc.) to the application 104. Based on input received from the application, the facilitator 102 estimates meat weight of animals. The facilitator 102 receives an order from the application 104 and forwards that order to one of the processors 108. The facilitator 102 includes a processor database 110, and an animal database 112, and an order server 114. The order server 114, the processor database 110, and the animal database 112 may be hosted in a cloud computing environment, where the order server 110 is a service executing within the cloud computing environment.

The processor database 110 is one or more databases that associate processors with processor information (e.g., location, availability, etc.) and processor menus (e.g., a list of goods and services provided by the processor 108, etc.). The animal database 112 includes meat weight estimates for different types of animals (e.g., deer, cow, pig, lamb, goat, moose, bison, etc.) based on different criteria (e.g., size, gender, etc.) by cuts of meat (e.g., brisket, ribs, front shank, rear shank, chuck, heart, flank, sirloin, tenderloin, round, plate, steak, roast, rump, leg, shoulder, backstraps, belly, etc.) to be processed. For example, the animal database 112 may include an estimate for a tenderloin of a deer buck that is large (e.g. greater than 150 pounds).

The order server 114 communicates with the application 104 and the processors 108. The order server 110 may include one or more services that operate in the cloud environment as described below. The order server 114 receives a search query from the application 104 that includes criteria to related to the processors 108. For example, the criteria may include a geographic location, a particular product or service, and/or a reputation score, etc. The order server 114 queries the processor database 110 using the criteria and returns a search result to the application 104 that includes one or more processors 108 that meet the criteria. In response to receiving a selection of one of the processors 108, the order server 114 forwards the menu associated with that processor 108 to the application 104.

The order server 114 receives characteristics (e.g., gender, size, preferred cuts, areas of the animal that have sustained damages, etc.) of one or more animals. Cross-referencing the characteristics with the animal database 112, the order server 114 estimates a meat weight available to be processed. In some examples, the meat weight is subdivided into cuts to facilitate ordering specific types of cuts. For example, because a flank steak is only available from the flank of an animal the meat weight available from the flank may be separately tracked to limit the amount of cuts can be ordered from the flank. The meat weight(s) is/are transmitted to the application 104.

The order server 114 receives an order from the application 104 that indicates the preferences of the user regarding the butchering of the animal and/or an allocation of the estimated meat weight. In some examples, the order includes (i) amounts (e.g., in points, kilograms, etc.) of goods that the user prefers and (ii) and a set of rules to determine how to account for variations in the actual meat weight from the estimated meat weight. For example, the order may indicate that the user wants five pounds of summer sausage, five pounds of jerky, and two pounds of ground meat and may indicate that the summer sausage is the first priority. In such an example, if there is only eleven pounds of actual meat weight, the order may result in five pounds of summer sausage, five pounds of jerky, and one pound of ground meat. The order server 114 generates an order confirmation with indicia used to identify the order and electronically sends the order to the one of the processors 108 that was selected by the user along with the indicia. The indicia is also sent to the application 104 to be used to associate the animal with the order when the animal is transported to the processor 108.

Figure 2:
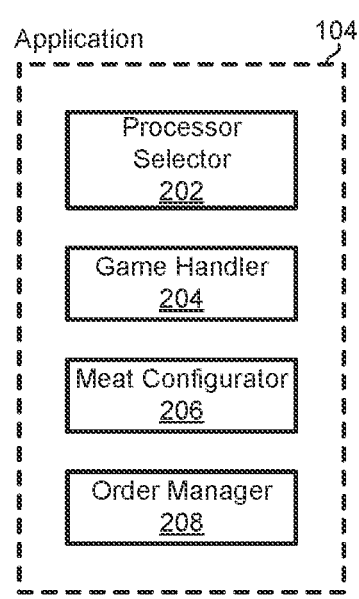
FIG. 2 illustrates an application executing on a mobile device to facilitate processing meat.

The application 104 receives information from the order server 102 and presents that information to the user via graphical user interfaces (GUIs). FIG. 2 illustrates an example structure of the application 104. In the illustrated example, the application 104 includes a processor selector 202, a game handler 204, a meat configurator 206, and an order manager 208.

As described in FIGS. 4 and 5 below, the processor selector 202 presents interfaces to the user to receive input of criteria to select a processor 108 and receive a selection of one of the processors 108. For example, the input criteria may be based on coordinates from a global positioning system (GPS) receiver of the mobile device 106. As described in FIGS. 4 and 6 below, the game handler 204 presents interfaces to receive input of the characteristics of one or more animals and/or desired cuts to facilitate estimation of the available meat weight. For example, the interfaces may facilitate selection of the gender, size, the cuts of the animal to harvest, and the locations of the animal that have been damaged. As described in FIGS. 4 and 7 below, the meat configurator 206 presents interfaces to receive input of user selection of goods and services from the menu of processor 108 selected via the processor selector 202. The meat configurator 206 facilitates orders being dynamically defined based on the menus specified by the selected processor 108. The interface displays the amount of available meat weight based on the estimation provided in response to the input to the game handler 204. The meat configurator 206 tracks the use of the meat weight as the user selects products and services. As described in FIG. 4 below, the order manager 208 processes and places an order based on the selections received by the meat configurator 206. In some examples, the order manager 208 manages interfaces to communicate the indicia received from the order server 114.

Figure 3A:
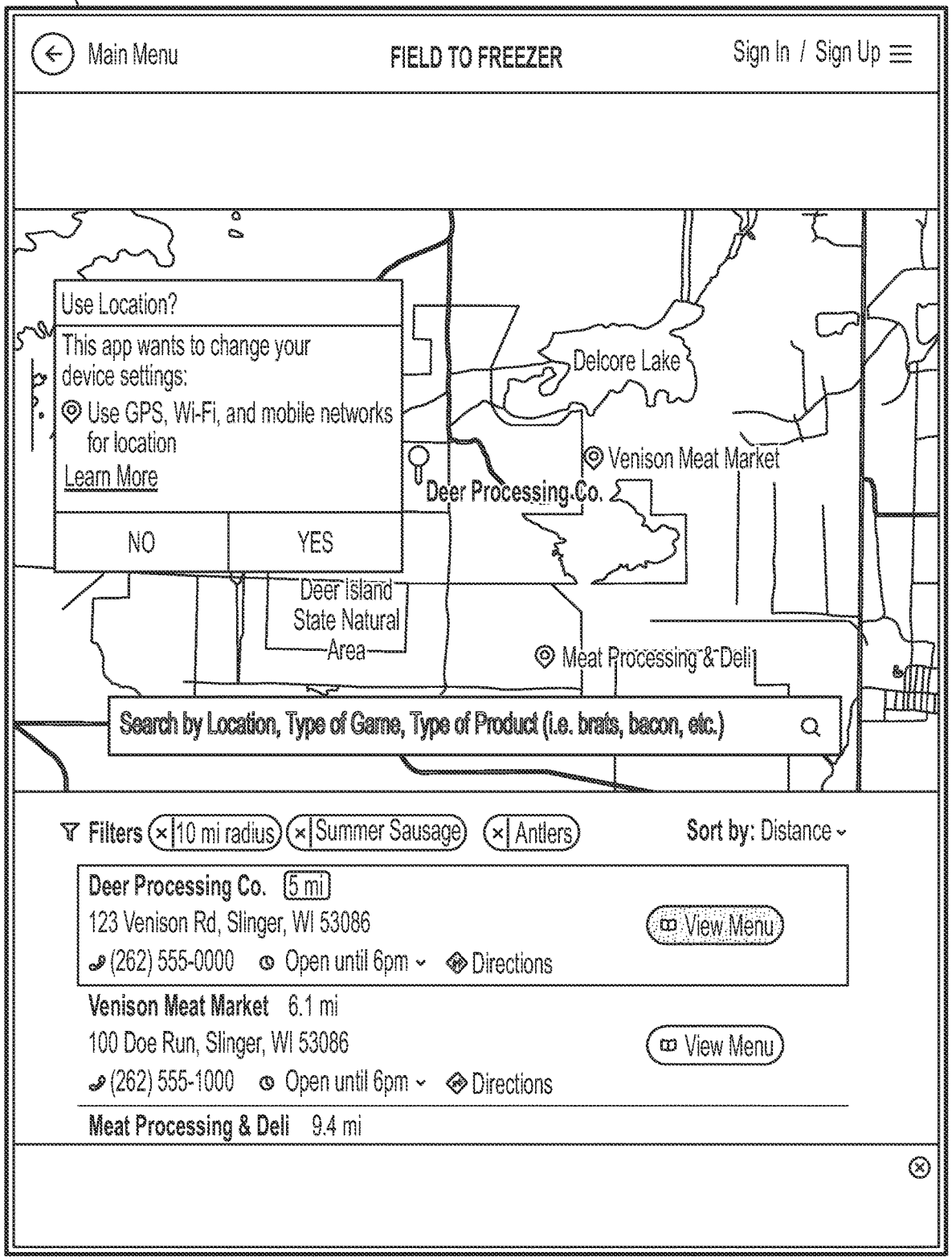

FIGS. 3A through 3J illustrate GUIs presented by the application 104 to facilitate processing meat. FIG. 3A depicts an example search interface 302 presented by the processor selector 202 that (a) receives a selection of criteria from the user to send to the order server 114, (b) displays the information (e.g., name, address, relative distance from the mobile device 106, phone number, hours of operation, etc.) of the processors 108 from the processor database 110 that meet the criteria, and (c) receives a selection of one of the displayed processors 108. In the illustrated example, the search interface 302 displays the locations of the processors 108 on a map. The search interface 302 may be displayed, for example, after the user logs into the application 104.

Figure 3B:
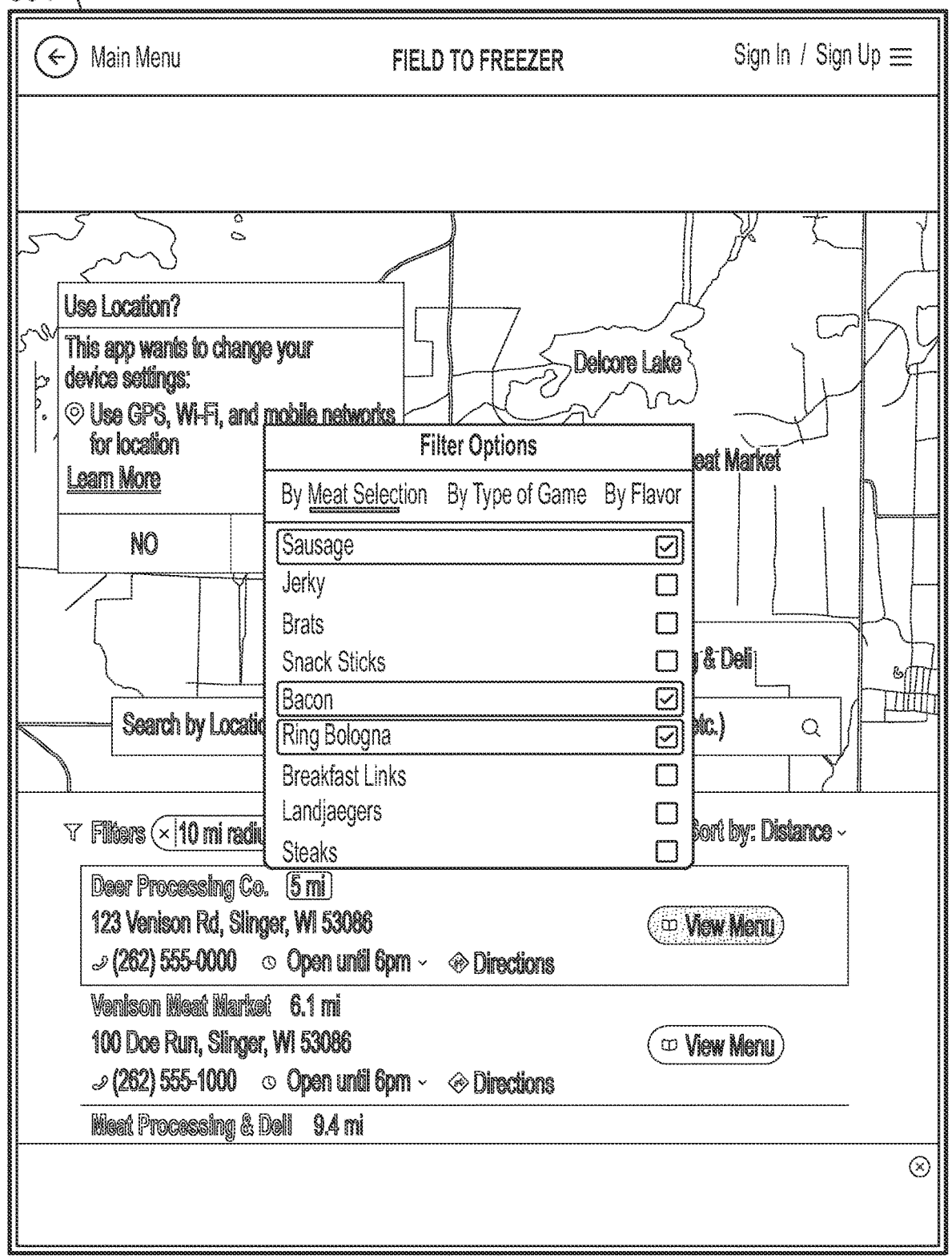

FIG. 3B depicts an example filter interface 304 presented by the processor selector 202 that (a) displays selections of the criteria and (b) relieves an input of one or more criteria from the user. The filter interface 304 may be displayed, for example, in response to the user selecting a filter option on the search interface 302.

Figure 3C:
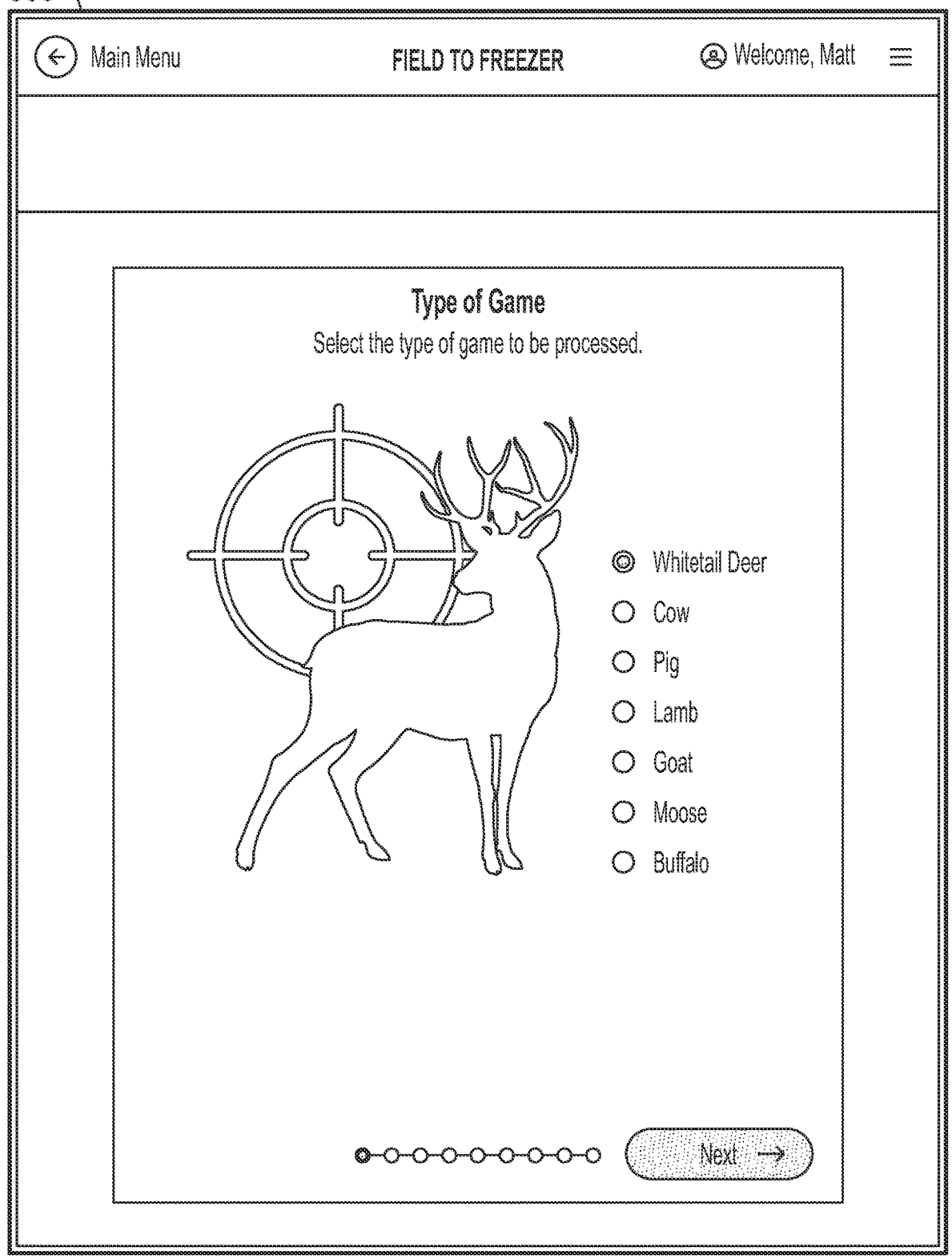

FIG. 3C is an animal selection interface 306 that is presented by the game handler 204. In the illustrated example, the animal selection interface 306 lists a selection of animals of which the order server 114 can estimate the meat weight. The user selects one of the animals from the list.

Figure 3D:
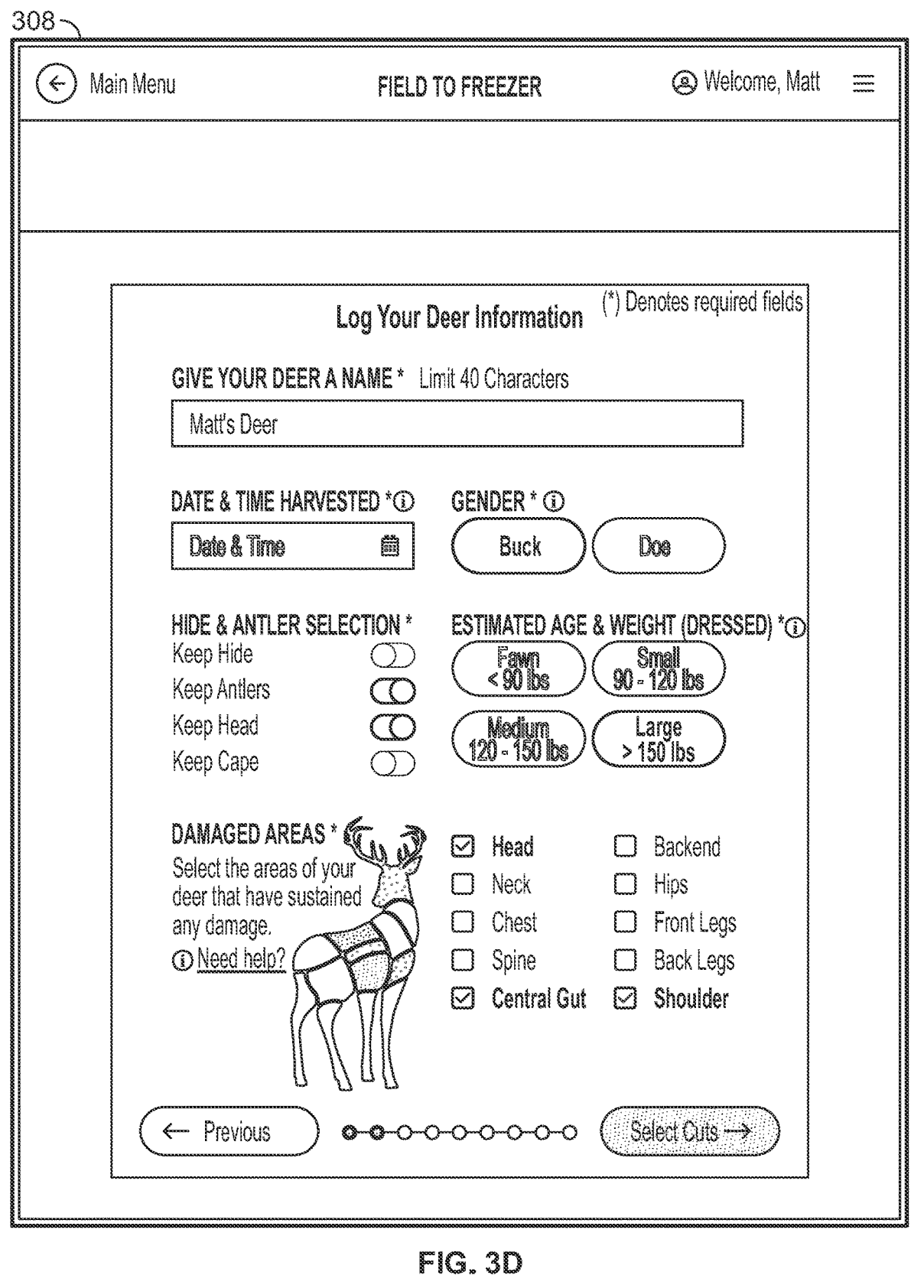

FIG. 3D is an animal characteristics interface 308 that is presented by the game handler 204. In the illustrated example, the animal characteristics interface 308 presents options to input the characteristics of the animal selected on the animal selection interface 306. In the illustrated example, the animal characteristics interface 308 includes fields to input the gender of the animal, the estimated age and/or weight of the animal, and the areas of the animal that have sustained damage. The input into the animal characteristics interface 308 are sent to the order server 114 to be used to estimate the available meat weight of the animal.

Figure 3E:
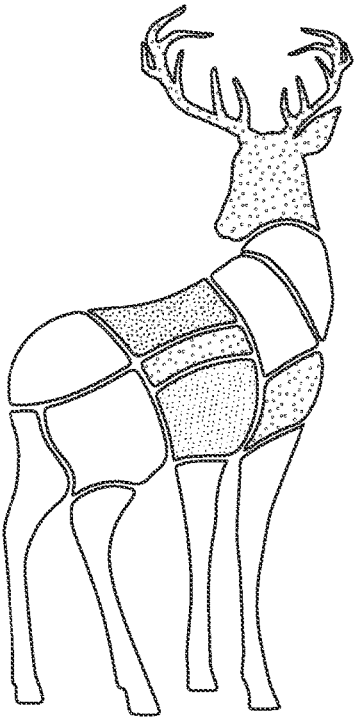

FIG. 3E is a meat cut interface 310 that is presented by the game handler 204. The meat cut interface 310 presents options to input the cuts of meat of the animal that the user wants butchered. The input to the meat cut interface 310 is sent to the order server 114 to estimate the available meat weight of the animal (e.g., the cuts that are selected are butchered and not available as part of the meat weight or affect the available meat weight).

Figure 3F:
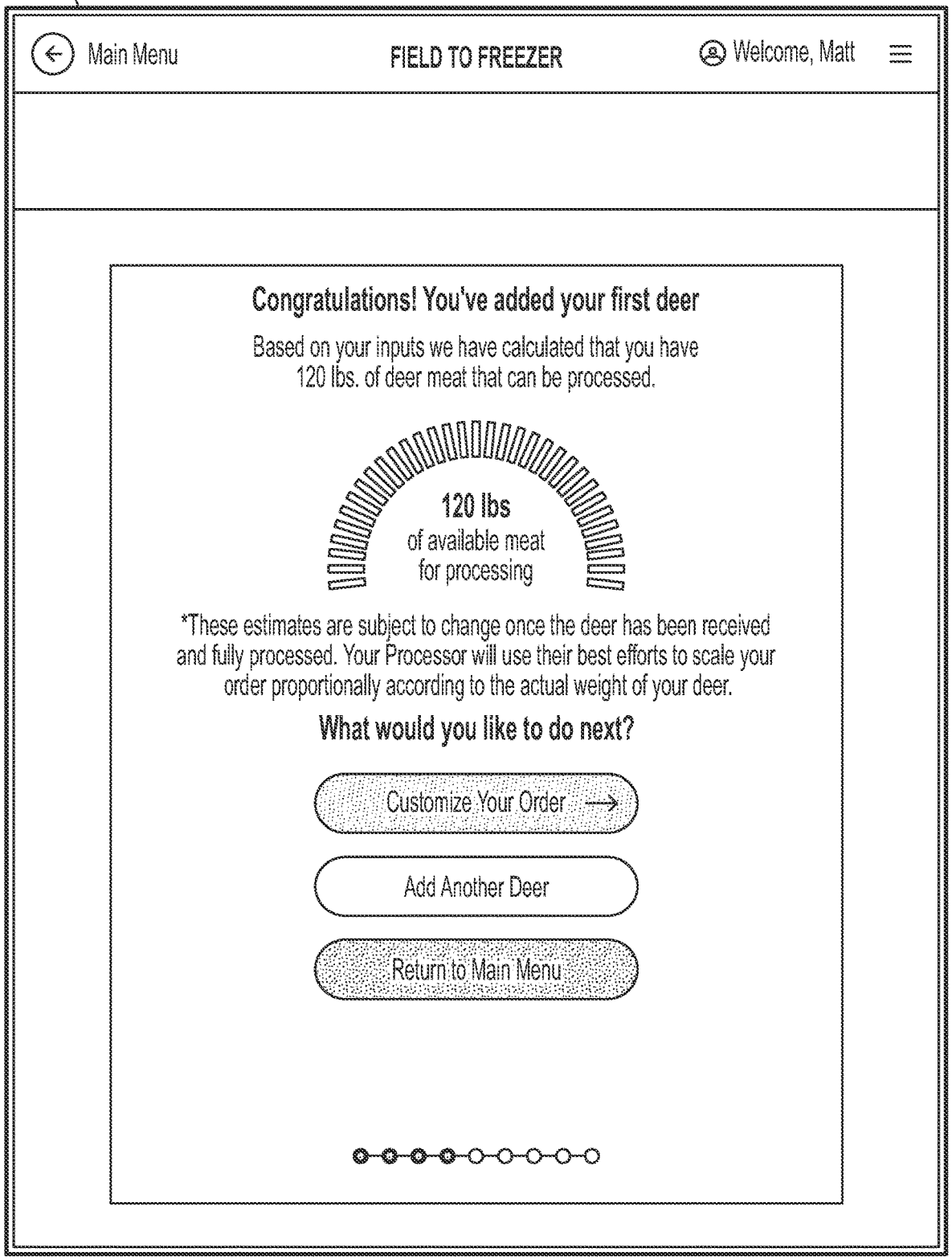

FIG. 3F is a meat weight estimate interface 312 that displays the estimated meat weight received from the order server 114 that is presented by the meat configurator 206. The estimated meat weight is based on the size and gender of the animal (enter into the animal characteristics interface 308) minus a portion to account for damage to the animal (entered into the animal characteristics interface 308) and the specific cuts to be butchered (entered into the meat cut interface 310).

Figure 3G:
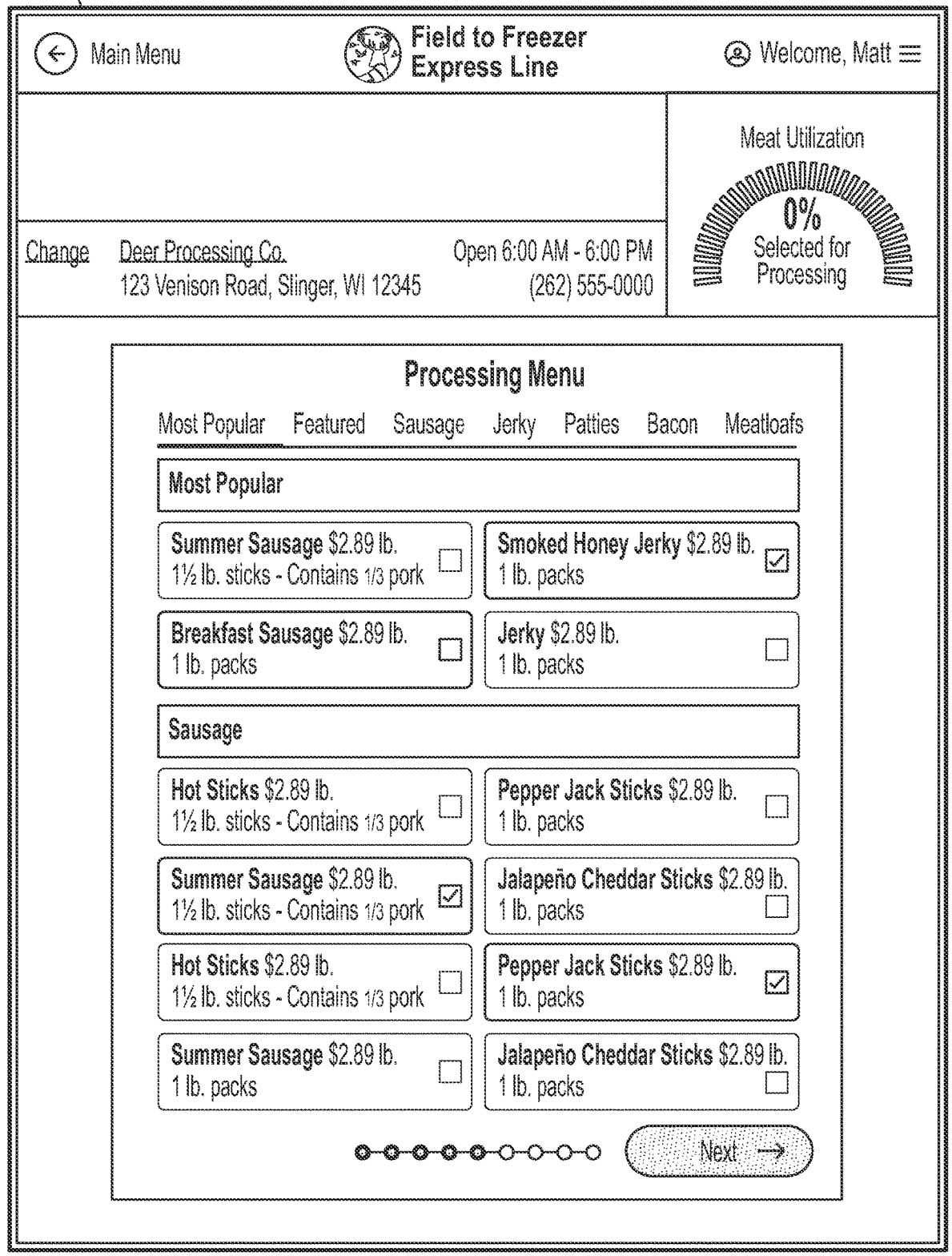

FIG. 3G illustrates an example menu selection interface 314 that is presented by the meat configurator 206. The menu selection interface 314 presents the menu that the order server 114 retrieves from the processor database 110 corresponding to the processor 108 selected on the search interface 302. The menu selection interface 314 presents goods and services provided by the selected processor 108. In the illustrated example, the menu selection interface 314 also displays and updates the amount of available meat weight based on the estimate meat weight and the meat weights used by the selections.

Figure 3H:

FIG. 3H illustrates an example menu configuration interface 316 that is presented by the meat configurator 206. In the illustrated example, the menu configuration interface 316 displays a summary of the goods and services selected (e.g., the parts of the animal to be preserved that are selected on the animal characteristics interface 308, the cuts of meat that are selected on the meat cut interface 310, and the goods and services that are selected on the menu selection interface 314, etc.). The menu configuration interface 316 includes input fields that facilitate the user changing the amount of a particular good selected on the menu selection interface 314 and/or to define the percentage of the estimated meat weight to be used to produce that particular good when the actual meat weights is determined by the processor 108. In the illustrated example, the menu configuration interface 316 includes a sliding bar (sometimes referred to as a "slider") for increasing/decreasing quantities of the goods selected on the menu selection interface 314. This provides visual feedback to the user as to how the animal is being utilized in a manner that is easy to understand and intuitive on a limited sized screen (such as a smartphone or other wearable smart device).

FIG. 3I illustrates an example ground meat selection interface 318 that is presented by the meat configurator 206. The ground meat selection interface 318 provides inputs for the user to select how to handle any remaining estimated meat weight not used up in the selection of the goods and services on the menu selection interface 312 and/or the menu configuration interface 314

Figure 3J:
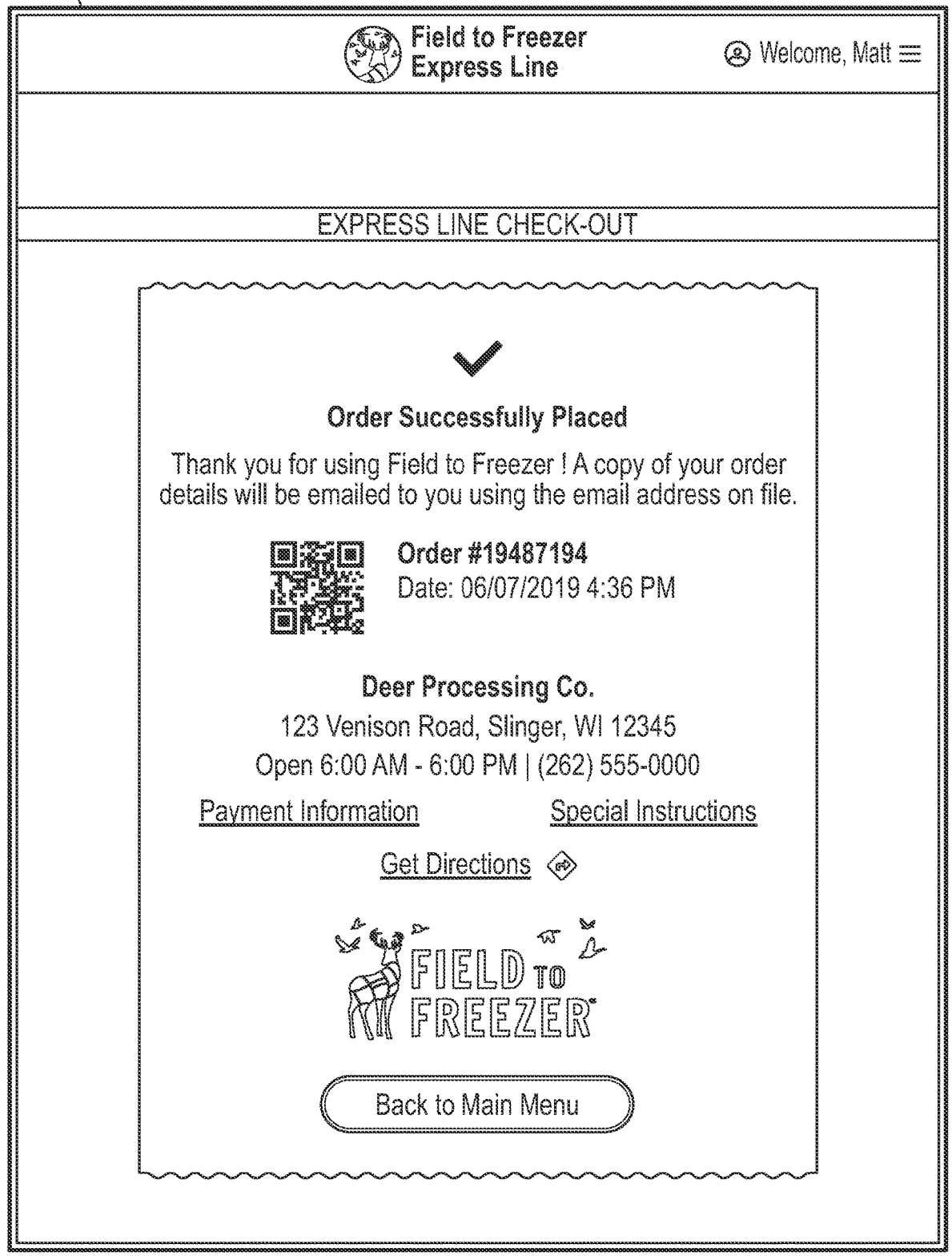

FIG. 3J illustrates an example order confirmation interface 320 that is presented by the order manager 208 to confirm that the order has been sent to the order server 114 and to display the indicia associated with the order to the user. The indicia is available to provide to the processor 108 when the animal is physically delivered to the processor 108.

Figure 4:
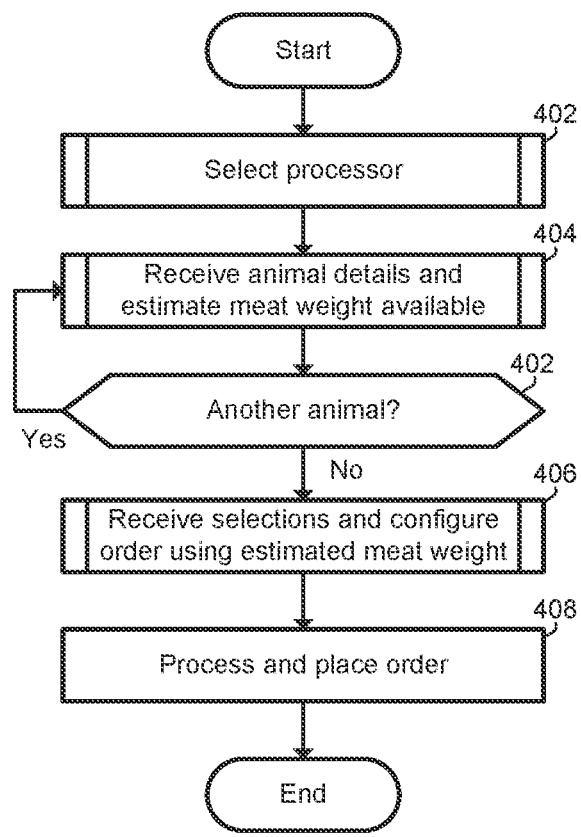
FIGS. 4 through 7 are flowcharts of a method to process meat, which may be implemented by the application of FIG. 2 executing on the mobile device of FIG. 8.
Figure 8:
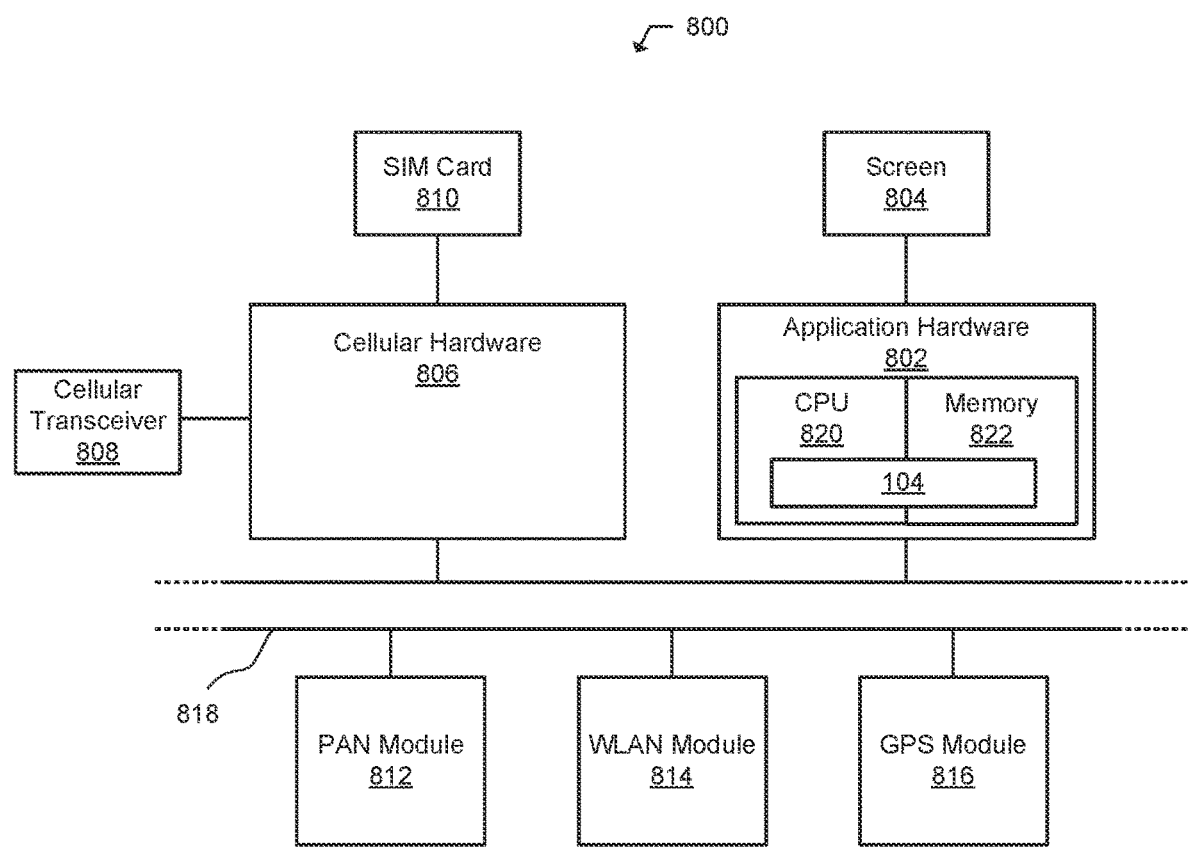
FIG. 8 is a mobile device to execute the application of FIG. 2.

FIG. 4 is a flowchart of a method to efficiently provision for the butchering of an animal, which may be implemented on the mobile device 106 of FIGS. 1 and 8. Initially, at block 402, the processor selector 202 receives an input of a selection of one of the processors 108. The processor selector 202 presents interfaces (e.g., the search interface 302 of FIG. 3A and the filter interface 304 of FIG. 3B above, etc.) to facilitate displaying available processors 108 and receiving a selection of one of the processors 108. An example method of receiving the input of the selection of one of the processors 108 is disclosed in connection with FIG. 5 below.

At block 404, the game handler 204 receives characteristics of an animal to be processed and, with the order server 114, estimates the meat weight available to be processed. The game handler 204 presents interfaces (e.g., the animal selection interface 306 of FIG. 3C, the animal characteristics interface 308 of FIG. 3D, the meat cut interface 310 of FIG. 3E, and the meat weight estimate interface 312 of FIG. 3F above, etc.) to receive the input of the animal characteristics used to estimate the available meat weight. An example method of receiving characteristics of the animal is disclosed in connection with FIG. 6 below. At block 406, the game handler 204 determines whether there is another animal that will be processed. When there is another animal, the method returns to block 404. Otherwise, when there is not another animal, the method continues to block 408.

At block 408, the meat configurator 206 receives selections from the user and configures an order using the estimated meat weight. The meat configurator 206 presents interfaces (e.g., the menu selection interface 314 of FIG. 3G, the menu configuration interface 316 of FIG. 3H, and the ground meat selection interface 318 of FIG. 3I above, etc.) to receive the input to compose the order. An example method of receiving the input to compose the order is disclosed in connection with FIG. 7 below.

At block 410, the order manager 208 processes and places the order by structuring the order and sending it to the order server 114. The order manager receives confirmation of the order and indicia associated with the order from the order server 114. The order manager 208 presents an interface (e.g., the order confirmation interface 320 of FIG. 3J above, etc.) to display the order confirmation and in the indicia. The indicia may be later used to associated the order with the animal when the animal is taken to the processor 108. For example, the processor 108 may include an optical scanner to read the indicia from the mobile device 106. As another example, the indicia may be imported into an electronic payment application (sometimes referred to as an "electronic wallet") that communicated with a near field communication device at the processor 108 to transfer the indicia to the processor 108

Figure 5:
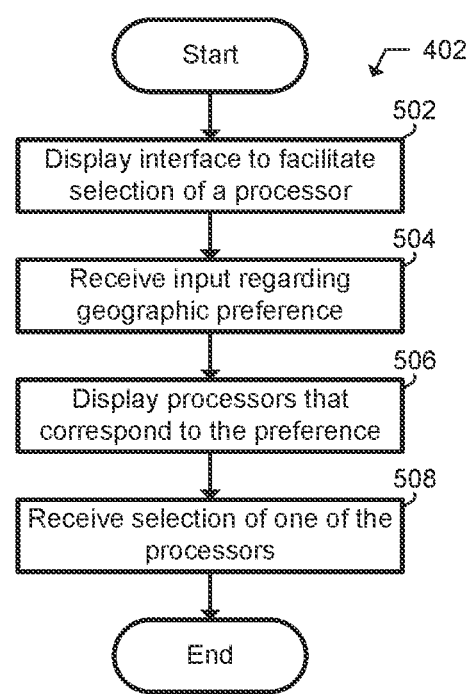

FIG. 5 is a flowchart of a method for receiving the input of the selection of one of the processors 108. At block 502, the processor selector 202 presents one or more interfaces (e.g., the search interface 302 of FIG. 3A and the filter interface 304 of FIG. 3B above, etc.) to facilitate selection of one of the processors 108. For example, the processor selector 202 may provide input fields to input criteria, such as specific desired goods and/or services, location, and/or type of animal, etc. In some examples the processor selector 202 receives the coordinates of the mobile device 106 from a GPS receiver of the mobile device 106. At block 504, the processor selector receives input regarding the preferences of the user. For example, the input may include criteria of "20 mile radius; deer; antlers; brats; summer sausage." The processor selector 202 sends the preferences to the order server 114 to query the processor database 110 to create a list of one or more processors 108 that meet the criteria. At block 506, the processor selector 202 receives the list of processors that correspond to the user's preferences and displays it on the interface. At block 508, the processor selector 202 receives a selection of one of the processors 108 via the presented interface.

Figure 6:
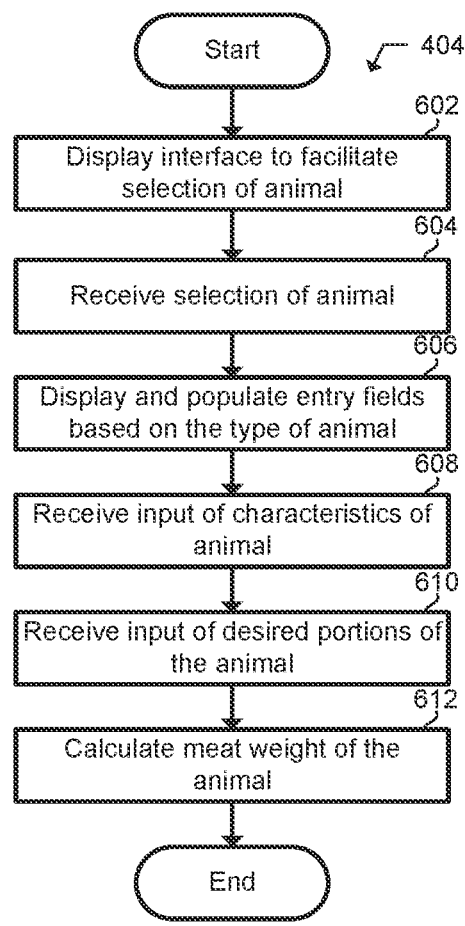

FIG. 6 is a flowchart of a method for receiving characteristics of the animal. At block 602, the game handler 204 presents an interface to facilitate selection of an animal (e.g., the animal selection interface 306 of FIG. 3C above). At block 604, the game handler 204 receives a selection of the animal via the interface. At block 606, the game handler presents an interface (e.g., the animal characteristics interface 308 of FIG. 3D above) to facilitate input of characteristics of the animal selected at block 604. The interface is populated with fields that are based on the selected animal. For example, the interface may include a field relating to processing options for antlers when a deer is selected, but not when a pig is selected. At block 608, the game handler 204 receives an input of the characteristics of the animal. At block 610, the game handler 204 presents an interface (e.g., the meat weight estimate interface 312 of FIG. 3F above) to facilitate the user indicating which parts of the animal the user desires to be butchered into specific cuts of meat (e.g., belly, ribs, tenderloin, etc.). At block 612, the game handler 204 receives an input of the desired cuts of meat through the interface. At block 614, the game handler 204, with the order server 114, estimates the available meat weight of the animal. The available meat weight is estimated based on the characteristics of the animal (e.g., gender, size, etc.), the areas that the animal sustained damage, and the areas of the animal that will be butchered into specific cuts of meat. In some examples, the order server 114 uses this information to query the animal database 112. The order server 114 sends the estimated meat weight to the application 104 to be displayed by the game handler 204.

Figure 7:
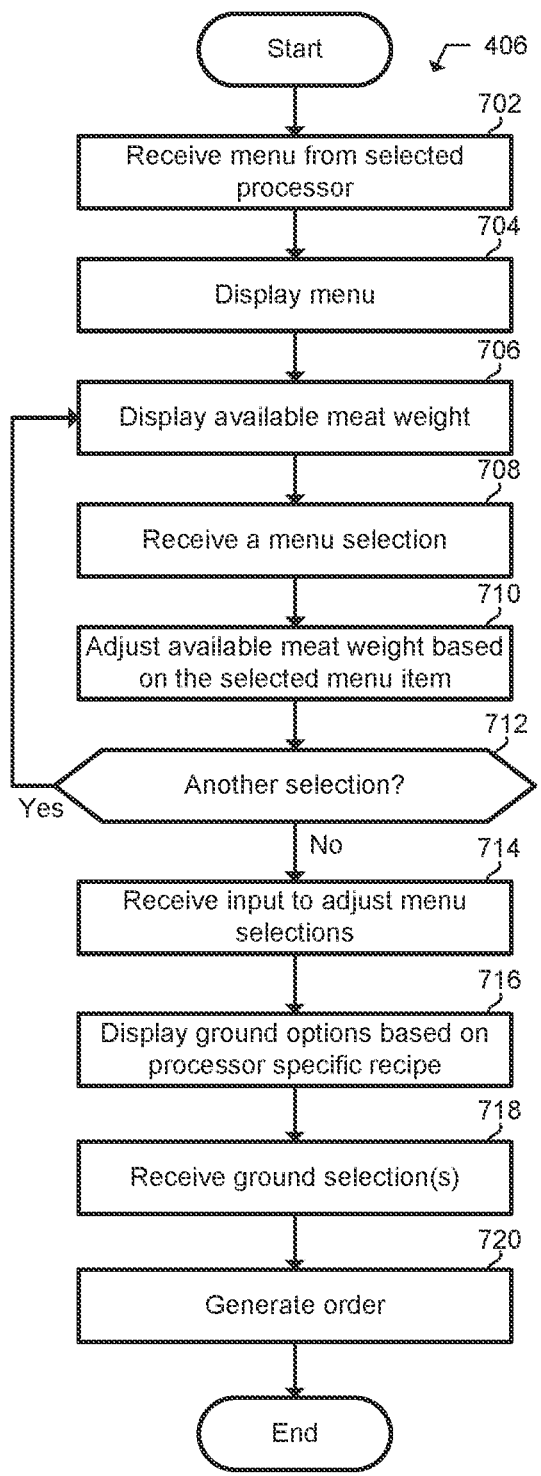

FIG. 7 is a flowchart of a method to receive input to generate an order. At block 702, the meat configurator 206 receives the menu of goods and services of the processor 108 selected by the user from the order server 114. At block 704, the meat configurator 206 presents the menu in an interface (e.g., the menu selection interface 314 of FIG. 3G above). At block 706, the menu selection interface 314 of FIG. 3G displays, on the interface, the available meat weight. When no menu item is selected, the available meat weight is the estimated meat weight. At block 708, the meat configurator 206 receives, via the interface, a selection of an item on the menu. At block 710, the meat configurator 206 adjusts the available meat weight based on the selection. At block 712, the meat configurator 206 determines whether there will be another selection. For example, the meat configurator 206 determines there will not be another selection when the "next" button is pressed on the interface. When there will be another selection, the method returns to block 706. Otherwise, if there is not going to be another selection, the method continues at block 714.

At block 714, the meat configurator 206 displays an interface (e.g., the menu configuration interface 316 of FIG. 3H above) to configure and/or adjust the menu items selected at block 706 through 710. For example, the user may adjust the amount (e.g., by weight, by quantity, by percentage, etc.) of the selected items. At block 716, the meat configurator 206 displays an interface (e.g., the ground meat selection interface 318 of FIG. 3I) to facilitate the user allocating the remaining meat weight to ground meat options offered by the processor 108. In some examples, the processor 108 has a default option to allocate the remaining meat weight. For example, by default, the remaining meat weight may be allocated to an animal-pork blend. At block 718, the meat configurator 206 receives input of one or more ground selections. When the user has competed allocating the remaining meat weight, at block 720, the meat configurator 206 generates the order to send to the order server 114.

The flowcharts of FIG. 4-7 are representative of machine readable instructions stored in memory (such as the memory 822 of FIG. 8 below) that comprise one or more programs that, when executed by a processor (such as the processor 820 of FIG. 8 below), cause the mobile device 106 to implement the example processor selector 202, the example game handler 204, the example meat configurator 206, the example order manager 208, and/or, generally, the application 104 of FIGS. 1, 2, and 8. Further, although the example program(s) is/are described with reference to the flowcharts illustrated in FIGS. 4-7, many other methods of implementing the example processor selector 202, the example game handler 204, the example meat configurator 206, and/or the example order manager 208 may alternatively be used. For example, the order of execution of the blocks may be changed, and/or some of the blocks described may be changed, eliminated, or combined.

Alternatively, in some examples, the flowcharts of FIG. 4-7 are representative of machine readable instructions stored in memory of a web server that comprise one or more services that, when executed by one or more processors of the web server, cause the web server to implement the example processor selector 202, the example game handler 204, the example meat configurator 206, the example order manager 208, and/or, generally, the application 104 of FIGS. 1, 2, and 8 to interact with a web browser executing on the mobile device 106 or the computing device in communication with webserver.

FIG. 8 is a block diagram of electronic components 800 of the mobile device 106 of FIG. 1. In the illustrated example, the electronic components 800 include application hardware 802, a screen 804, cellular hardware 806, a cellular transceiver 808, a SIM card 810, a personal area network (PAN) module 812, a wireless local area network (WLAN) module 814, a GPS receiver 816, and a data bus 818.

The application hardware 802 includes a processor or controller 820 and memory 822. In the illustrated example, the application hardware 802 is structured to include application 104. The processor or controller 820 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 822 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), and/or read-only memory. In some examples, the memory 822 includes multiple kinds of memory, particularly volatile memory and non-volatile memory.

The memory 822 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 822, the computer readable medium, and/or within the processor 820 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The screen 804 receives input from the user(s) and display information (such as, the interfaces 302-320). In the illustrated example, the screen 804 is a touch screen. The user interacts with the interfaces 302-320 via the screen 804. The screen 804 may include a Liquid Crystal Display (LCD), a Thin Film Transistor LCD (TFT-LCD) display, an In Plane Switching LCD (IPS-LCD) display, an Organic Light-Emitting Diode (OLED) display, an Active Matrix OLED (AMO-LED) display, or a "Super AMOLED" display, etc.

The cellular hardware 806 includes hardware (e.g., processors, digital signal processing circuitry, memory, etc.) to communicate with a cellular network via the cellular transceiver 808. The cellular hardware 806 handles the cellular protocols (e.g., authentication, signal processing, transmission and reception, etc.). In some examples, the application hardware 802 and the cellular hardware 806 are combined into one hardware package. The cellular hardware 806 uses information stored on the subscriber identity module (SIM) card 810 to communicate with the cellular network, such as an international mobile subscriber identity (IMSI) number and a corresponding authentication key.

The PAN module 812 includes hardware (e.g., processors, memory, storage, antenna, etc.) to communicate with other devices (e.g., a vehicle, a headset, headphones, a smart watch etc.) using a personal area network protocol (e.g., Bluetooth®, Zigbee®, etc.). The WLAN module 814 includes hardware (e.g., processors, memory, storage, antenna, etc.) to communicate with external networks (e.g., the Internet, etc.) using a wireless local area network protocol (including IEEE 802.11 a/b/g/n/ac or others). The GPS receiver 816 receives signals from GPS satellites (and, in some example, the cellular network) and calculates the position of the mobile device 106.

The data bus 818 is one or more electrical connections that communicatively couple the application hardware 802, the cellular hardware 806, the PAN module 812, the WLAN module 814 and/or the GPS receiver 816. The data bus(s) 818 may include, for example, Serial Peripheral Interface (SPI) bus(s), Inter-Integrated Circuit ($I^2C$) bus(es), Universal Asynchronous (UART) bus(es), and/or Secure Digital Input/Output (SDIO) bus(es), etc.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for remotely allocating meat for processing, the system comprising:
   a database configured to store meat weight estimates associated with animal characteristics;
   a remote server configured to generate an estimated meat weight for an animal using the meat weight estimates of the database upon receiving characteristics of the animal; and
   a mobile device comprising a screen configured to display a series of interfaces, wherein the mobile device is configured to:
      receive selections of a meat processor, the animal, and the characteristics of the animal via the series of interfaces;
      retrieve the estimated meat weight from the remote server based on the characteristics of the animal;
      display, via the series of interfaces, a first graphical representation of an amount of available meat weight of the animal, goods offered by the meat processor for the animal, and adjustable input elements associated with the goods;
      receive, via at least one of the adjustable input elements of the series of interfaces, an allocation of the estimated meat weight for at least one of the displayed goods;
      update, in response to receiving the allocation via the adjustable input elements, the first graphical representation to depict an updated amount of the available meat weight;
      send an order corresponding with allocated meat of the animal to the remote server; and
      display, via the series of interfaces, an indicia associated with the order for presentation at the meat processor.

2. The system of claim 1, wherein at least one of the adjustable input elements displayed by the screen is a slider.

3. The system of claim 1, wherein the series of interfaces displayed by the screen includes a second graphic representation of the animal to facilitate selection of cuts of meat of the animal.

4. The system of claim 1, wherein the first graphical representation depicts a percentage of an allocated meat weight relative to the estimate meat weight.

5. The system of claim 1, wherein the series of interfaces displayed by the screen are configured to facilitate prioritization of a first good for instances in which the processor subsequently determines that an actual meat weight is different than the estimated meat weight.

6. A method for remotely allocating meat for processing, the method comprising:
   receiving selections of a meat processor, an animal, and characteristics of the animal via a series of interfaces displayed on a screen on a mobile device;
   retrieving an estimated meat weight from a database based on the characteristics of the animal;
   displaying, via the series of interfaces, a first graphical representation of an amount of available meat weight of the animal, goods offered by the meat processor for the animal, and adjustable input elements associated with the goods;
   receiving, via at least one of the adjustable input elements of the series of interfaces, an allocation of the estimated meat weight for at least one of the displayed goods;
   in response to receiving the allocation via the adjustable input elements, updating the first graphic representation to depict an updated amount of the available meat weight;
   sending an order corresponding with allocated meat of the animal to the meat processor; and
   displaying, via the series of interfaces, an indicia associated with the order for presentation at the meat processor.

7. The method of claim 6, wherein at least one of the adjustable input elements displayed via the series of interfaces is a slider.

8. The method of claim 6, further comprising displaying, via the series of interfaces, a second graphic representation of the animal to facilitate selection of cuts of meat of the animal.

9. The method of claim 6, wherein the first graphical representation displayed via the series of interfaces depicts a percentage of an allocated meat weight relative to the estimate meat weight.

10. The method of claim 6, wherein the series of interfaces displayed by the screen facilitate prioritization of a first good for instances in which the processor subsequently determines that an actual meat weight is different than the estimated meat weight.

11. A tangible computer readable medium comprising instructions, which, when executed, cause a machine to:
   receive selections of a meat processor, an animal, and characteristics of the animal via a series of interfaces displayed on a screen;
   retrieve an estimated meat weight from a database based on the characteristics of the animal;
   display, via the series of interfaces, a first graphical representation of an amount of available meat weight of the animal, goods offered by the meat processor for the animal, and adjustable input elements associated with the goods;
   receive, via at least one of the adjustable input elements of the series of interfaces, an allocation of the estimated meat weight for at least one of the displayed goods;
   update, in response to receiving the allocation via the adjustable input elements, the first graphic representation to depict an updated amount of the available meat weight;
   send an order corresponding with allocated meat of the animal to the meat processor; and
   display, via the series of interfaces, an indicia associated with the order for presentation at the meat processor.

12. The tangible computer readable medium of claim 11, wherein at least one of the adjustable input elements displayed via the series of interfaces is a slider.

13. The tangible computer readable medium of claim 11, wherein the instruction, when executed, further cause the machine to display, via the series of interfaces, a second graphic representation of the animal to facilitate selection of cuts of meat of the animal.

14. The tangible computer readable medium of claim 11, wherein the first graphical representation displayed via the series of interfaces depicts a percentage of an allocated meat weight relative to the estimate meat weight.

15. The tangible computer readable medium of claim 11, wherein the series of interfaces displayed by the screen facilitate prioritization of a first good for instances in which the processor subsequently determines that an actual meat weight is different than the estimated meat weight.

16. The tangible computer medium of claim 11, wherein the instructions, when executed, cause the machine to receive the selection of the meat processor via a first interface of the series of interfaces.

17. The tangible computer medium of claim 11, wherein the instructions, when executed, cause the machine to receive the selection of the animal via a second interface of the series of interfaces.

18. The tangible computer medium of claim 11, wherein the instructions, when executed, cause the machine to receive the characteristics of the animal via a third interface of the series of interfaces.

19. The tangible computer medium of claim 11, wherein the instructions, when executed, cause the machine to display the first graphical representation, the goods offered by the meat processor, and the adjustable input elements via fourth interfaces of the series of interfaces.

20. The tangible computer medium of claim 11, wherein the instructions, when executed, cause the machine to display the indicia associated with the order via a fifth interface of the series of interfaces.

* * * * *